US006847005B2

(12) United States Patent
Alfille

(10) Patent No.: US 6,847,005 B2
(45) Date of Patent: Jan. 25, 2005

(54) LASER CUTTING METHOD

(75) Inventor: Jean-Pascal Alfille, Clamart (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/490,479

(22) PCT Filed: Oct. 3, 2002

(86) PCT No.: PCT/FR02/03368
§ 371 (c)(1),
(2), (4) Date: Mar. 23, 2004

(87) PCT Pub. No.: WO03/031109
PCT Pub. Date: Apr. 17, 2003

(65) Prior Publication Data
US 2004/0232123 A1 Nov. 25, 2004

(30) Foreign Application Priority Data
Oct. 5, 2001 (FR) .............................. 01 12831

(51) Int. Cl.⁷ .......................... B23K 26/38; B23K 26/14
(52) U.S. Cl. ............................ 219/121.72; 219/121.84
(58) Field of Search ...................... 219/121.67, 121.72, 219/121.84

(56) References Cited

U.S. PATENT DOCUMENTS

| 4,044,936 | A | * | 8/1977 | Obersby et al. ............... 225/2 |
| 5,059,256 | A | | 10/1991 | Kanapenas et al. ..... 219/121.67 |
| 5,578,228 | A | | 11/1996 | Beyer et al. ............ 219/121.84 |
| 5,688,418 | A | * | 11/1997 | Yoshiyasu et al. ...... 219/121.71 |
| 5,916,460 | A | * | 6/1999 | Imoto et al. ........... 219/121.67 |
| 6,284,999 | B1 | * | 9/2001 | Virtanen et al. ........ 219/121.67 |
| 6,692,337 | B2 | * | 2/2004 | Jennings et al. .............. 451/36 |
| 2001/0003697 | A1 | | 6/2001 | Jennings et al. |

FOREIGN PATENT DOCUMENTS

| EP | 0 458 180 | 11/1991 |
| JP | 9-1369 | 1/1997 |
| JP | 2000-210785 | 8/2000 |

OTHER PUBLICATIONS

Böhme, et al., "handbuch der Schweissverfahren, Teil 2", Handbuch Der Schweissverfahren, pp. 164–189 XP002206753.

* cited by examiner

Primary Examiner—Geoffrey S. Evans
(74) Attorney, Agent, or Firm—Oblon, Spivak, McClelland, Maier & Neustadt, P.C.

(57) ABSTRACT

A laser cutting device and method using a laser beam passing through an optical device producing a focal spot with a diameter between about 1.5 and 3 mm, and using a working gas flow. According to the device and method, the working gas flow is ejected from a nozzle at a pressure of between about 1 and 3 bars.

5 Claims, 1 Drawing Sheet

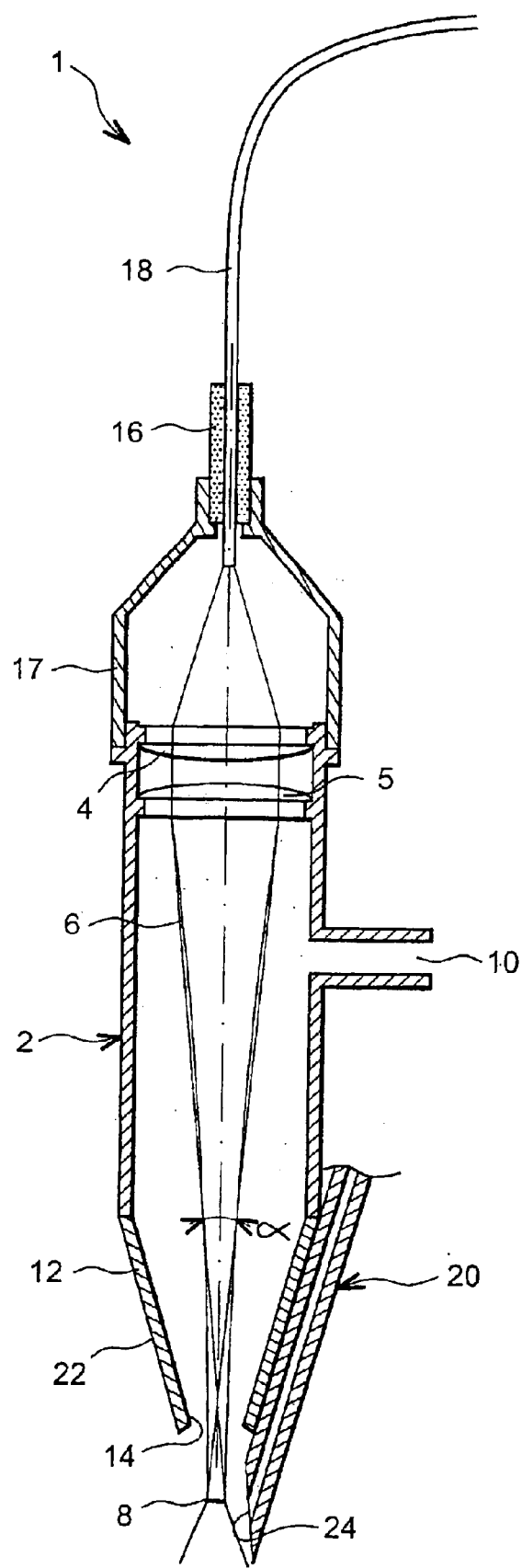

LASER CUTTING METHOD

TECHNICAL FIELD

The technical field of this invention is devices and methods for industrial cutting by power lasers, and more particularly laser cutting devices comprising a head containing optical means through which a laser beam passes.

More specifically, the technical field of the invention relates to laser cutting devices and methods capable of cutting thick materials, particularly materials used in the nuclear industry and shipbuilding industry installations.

STATE OF PRIOR ART

Several embodiments have already been proposed in this field.

Known laser cutting devices are comprising a head containing optical means through which a laser beam can pass. In this type of device, the head is extended by a nozzle comprising an output orifice through which the laser beam passes to cut a part by forming a chase, and a working gas flow to evacuate metallic particles outside the chase. According to the state of the art, high pressures of the order of 10 to 20 bars are necessary for this working gas, particularly in order to efficiently eject these metallic particles outside the chase.

The focal spot of the laser beam is preferably located at about one third of the total thickness of the part to be cut, this parameter being known according to prior art to give a good quality cut.

In general, laser cutting devices comprise nozzles with a special internal profile, the shape of these nozzles satisfying the need to optimize the shape of a jet and to increase its kinetic energy.

According to prior art, the focal spot output from the laser beam of the device must have a small diameter of the order of 0.5 mm in order to form the narrowest possible chase, the width of the chase being equal to approximately the diameter of the focal spot.

However, when this type of device is used to cut thick parts, problems are encountered that create cutting faults. Attachment points between the different portions of the part to be dissociated can remain when the thickness of the part is more than 10 mm and more particularly when this thickness is more than 50 mm or even a value of more than 100 mm.

Presentation of the Invention

Therefore, the purpose of this invention is to at least partially overcome the disadvantages mentioned above, by proposing a laser cutting device and method to achieve a better cutting quality than could be obtained in prior art and/or a higher cutting speed, particularly for thick parts.

To achieve this, the first purpose of the invention is a laser cutting method using a laser beam passing through optical means producing a focal spot with a diameter between about 1.5 and 3 mm, and using a working gas flow. According to the invention, the working gas flow is ejected at a pressure of between about 1 and 3 bars.

Advantageously, the fact of combining a focal spot with a diameter of between about 1.5 and 3 mm and a working gas pressure between about 1 and 3 bars considerably improves the cutting quality and speed compared with embodiments proposed in prior art, particularly when cutting thick parts, typically thicker than 50 mm.

In general, it is noted that high gas pressures are used such that molten metallic particles are ejected as well as possible outside the chase, passing through the chase from a top surface as far as a bottom surface of the part. However, when using such pressures, it has been observed that a significant cooling effect occurs on the metal drop due to its considerable exposure to the gas flow. It has also been observed that the cooling effect caused by the high pressure of the working gas flow can be so high that laser irradiation caused by the laser beam is no longer sufficient to keep the metal drop liquid throughout the time necessary to pass through the chase.

Consequently, unlike the conventional technical preconception described above according to which an attempt is made to use high gas pressures to obtain high kinetic energy of the gas and therefore good expulsion of particles outside the chase, it has been found that these high pressures can cause the opposite effect of preventing the cut from progressing.

Thus, by providing a working gas pressure of between 1 and 3 bars, the cooling effect of the metal drop can be advantageously attenuated.

Furthermore, the particular dimensions adopted for the focal spot enable the addition of a large quantity of working gas inside the chase, consequently increasing its kinetic energy, and the kinetic energy can then reach a value similar to what would be obtained with high pressures, such as 10 to 20 bars. In this configuration, the large quantities of gas encounter less difficulties in entering down to the bottom of the chase to expel all molten metallic particles outside this chase.

Finally, it is noted that this particular characteristic of the size of the focal spot increases the distance between the walls of the chase, thus strongly reducing the problem of viscosity of the molten metal. Molten metallic particles can then flow more easily than in narrower chases.

With such a method according to the invention, all combined advantages described above make it possible firstly to cut thick parts at high speeds without leaving remaining residual attachment points, and secondly obtaining a better cutting quality than is possible with embodiments according to prior art.

Solid particles can be introduced into the working gas flow in order to further improve evacuation of molten metal outside the chase.

Advantageously, introducing solid particles in this way increases the kinetic energy of the working gas without causing the cooling effect of the liquid drop that could have been observed if the kinetic energy was increased due to an increase in the injection pressure of the working gas. Furthermore, the addition of these solid particles was found to be extremely positive in terms of increasing the cutting speed, improving the cut surface, or increasing the cut thickness for constant parameters.

Preferably, solid particles are composed of at least a metallic powder. In this respect, it is noted that one or several metallic powders may be used taken from among dense powders with high melting points, such as tungsten or molybdenum.

Preferably, the laser beam comprises an angle of convergence $\alpha$ less than about $10°$, at the output from the optical means.

The resulting advantage of this preferred embodiment of the invention is that it makes it possible to have a focused beam reflecting on the walls of the chase throughout the thickness of the part, even when cutting large parts. With this type of characteristic, it is then possible to do cutting work within a wide range of part thicknesses, without modifying the corresponding positions of the head of the cutting device used and the part to be cut.

Finally, this particular arrangement makes it possible to cut thick solid parts, and also hollow parts. Hollow parts can then be cut by making passes cutting several faces of the part at the same time, instead of needing to follow the contour of the part. For example, a hollow tube with a square section can be cut all the way through by passing the cutting device in front of only one face, whereas in prior art the cutting device had to be passed in front of each of the four faces of the tube.

Preferably, the focal spot of the laser beam is located on a top surface of a part to be cut, and also extends over a distance between about 40 and 60 mm before passing through the optical means. This specific feature makes a non-negligible contribution to reducing the size and cost of the device.

Another purpose of the invention is a laser cutting device comprising a head containing optical means are located through which a laser beam passes and which produce a focal spot with a diameter of between about 1.5 and 3 mm, the device also comprising means of injecting a working gas flow into the head. According to the invention, the working gas flow is ejected from the head through a nozzle at a pressure of between about 1 and 3 bars.

Preferably, the cutting device comprises an auxiliary nozzle capable of introducing solid particles into the working gas flow. It is then possible for the auxiliary nozzle to be mounted on an external wall of the nozzle that ejects the working gas flow, so that the corresponding output orifices of the nozzle and the auxiliary nozzle are located close to each other.

The optical means of the cutting device may be designed such that the laser beam has an angle of convergence $\alpha$ less than about 10° at the output from these optical means.

Preferably, the head of the device is adjusted such that the focal spot of the laser beam is located on a top surface of a part to be cut, in order to increase the cutting quality.

Furthermore, the head of the device comprises a nozzle with an output orifice with a diameter slightly greater than or equal to the said diameter of the focal spot of the laser beam. Thus, the laminar jet does not project uselessly outside the chase, and the gas pressure criterion is sufficient to characterize the working gas flow.

Advantageously, the head of the device is approximately cylindrical with an outside diameter of about 30 mm and a length of about 250 mm. This particularly compact arrangement limits the size of the device and consequently its cost.

According to a preferred embodiment of the invention, the head of the device is coupled to a mechanical assembly supporting an optical fibers cable bringing the laser beam facing the optical means of the head of the cutting device. The laser beam inside the mechanical assembly extends over a distance of between about 40 and 60 mm. As mentioned before, this small distance also contributes to reducing the size and cost of the device.

Preferably, the laser beam at the output from the device is located at a distance of between about 0.5 and 20 mm from a part to be cut. The fact that there is a relatively large margin of maneuver in positioning the part to be cut with respect to the device, considerably facilitates use of this device and consequently reduces the adjustment time, these adjustments being necessary before doing the cutting work.

The optical means in the device preferably comprise a collimation lens and a focusing lens facing each other.

Finally, the head can be disconnected from the device using remote controllable means.

Other characteristics and advantages of the invention will appear in the non-limitative detailed description given below.

BRIEF DESCRIPTION OF THE DRAWINGS

The description will be made with reference to the single FIGURE attached representing a diagrammatic view of a device according to a preferred embodiment of the invention.

DETAILED PRESENTATION OF A PREFERRED EMBODIMENT

The single FIGURE shows a laser cutting device 1 according to a preferred embodiment of this invention. The device 1 shows an Nd-YAG type laser, selected particularly due to the advantages related to the transport of a laser beam 6 by optical fibers or due to the advantages procured concerning the possibility of having a better interaction between this laser beam 6 and a part to be cut. However, note that it would be quite appropriate to use a $CO_2$ laser to implement the invention.

The invention is also intended to be used to cut parts with variable thicknesses, and more specifically for parts more than about 50 mm thick, or possibly even more than 100 mm. In any case, the invention proposes a laser cutting device for thick parts, the commonly accepted limit by those skilled in the art being 10 mm.

Similarly, the power output to device 1 is between about 4 and 6 kW, this value interval corresponding to the power normally used in devices according to prior art.

The device 1 comprises an approximately cylindrically-shaped head 2, including an outside diameter of about 30 mm and a length of about 250 mm, for an applied power of 6 kW. The values of the dimensions are the values selected for a preferred embodiment of the invention, those skilled in the art naturally being capable of adapting them as a function of the power supplied to the device 1, without going outside the scope of the invention.

There are optical means 4, 5 inside the head 2 of device 1, preferably formed by a collimation lens 4 and a convergence lens 5, these lenses being located facing each other.

The laser beam 6 passes through the optical means 4, 5 transported by an optical fibers cable 18. This cable 18 is supported by a mechanical assembly 16, 17, comprising a connector 16 surrounding the cable 18 and a mechanical interface 17 supporting this connector 16. The mechanical interface 17 is also coupled to the head 2 of the device 1, so as to position the laser beam 6 output from the cable 18 facing the optical means 4, 5.

Preferably, and particularly to limit the size of the device 1, the laser beam 6 extends inside the mechanical assembly over a distance of about 40 to 60 mm. Obviously, this value interval is not restrictive and those skilled in the art could modify it.

The optical means 4, 5 through which the laser beam 6 passes produce a focal spot 8, this focal spot 8 corresponding approximately to the width of a chase made in a part to be cut (not shown) when the device 1 is used. The diameter of this focal spot 8 varies from about 1.5 mm to about 3 mm.

The head 2 of the device 1 also comprises a nozzle 12 through which the laser beam 6 can pass through an output orifice 14, this output orifice 14 having a diameter slightly greater than or equal to the diameter of the focal spot 8. In other words, for reasons related to performances of the device 1, the diameter of the output orifice 14 of the nozzle 12 is equal to approximately the diameter of the focal spot 8.

The head 2 of the device 1 also comprises means 10 to inject a working gas into the head 2, this working gas being ejected coaxially to the laser beam 6, through the nozzle 12 at a pressure of between about 1 and 3 bars. These values are very different from prior art in which the working gas is ejected at much higher pressures of the order of 10 to 20 bars. The reason for using this pressure is to prevent the molten metallic particles located in the chase from being cooled and blocked in position before they are expelled from the chase. Therefore, low pressures have to be applied, while allowing the gas to perform its function of ejecting molten metallic particles. As non-limitative examples, the working gas flow ejected from the nozzle 12 may be a neutral gas such as $N_2$, Ar or He, or a reactive gas such as $O_2$.

Thus, a pressure of the working gas flow of between 1 and 3 bars and a diameter of the focal spot 8 between 1.5 and 3 mm, will give a high quality cut for parts more than 100 mm thick.

Also for example, if the working gas pressure is fixed at 2 bars, a satisfactory quality cut is obtained for a 60 mm thick part when the diameter of the focal spot is of the order of 1.5 mm, in other words when the width of the chase is equal to 1.5 mm. Similarly, very good results are obtained for a 100 mm thick part with a focal spot 8 of the order of 2.5 mm. In other words, the range of diameters of the focal spot 8 is still considerably greater than 0.5 mm, this value being recommended and used in prior art.

The laser beam 6 output from the optical fibers cable 18 is input into the head 2 of the cutting device 1, this laser beam 6 passing through optical means 4, 5, located inside the head 2. The laser 6 at the output from these optical means 4, 5, has an angle of convergence α less than about 10°. The small value of the angle of convergence α enables the focused laser beam 6 to be reflected on the walls of the chase, through the entire thickness of the part to be cut, thus making a good cut in the part.

Preferably, the angle of convergence α is between 5° and 9°, this range of values being different from prior art for which the measurements usually oscillate between 15° and 30°.

With this angle of convergence, there are almost no constraints on the spacing between the part to be cut and the device 1. Thus, it can be seen that a very good cutting quality is obtained for a spacing of between about 0.5 and 20 mm.

Furthermore, there is no longer any need to make precise measurements concerning the corresponding positions of the focal spot 8 and the part to be cut. Therefore, the focal spot 8 may be located at about one third of the thickness of the part, as in prior art, but it may also be located on an outside surface of this part to be cut or on any other nearby location. Note that the external surface refers to the surface of the part to be cut closest to the device 1, in other words the surface that comes into contact with the laser beam 6 first. With this arrangement, the positioning tolerance of the end of the head 2 of the device 1 with respect to the part to be cut is increased.

Preferably, the device 1 may be designed such that solid particles are introduced into the working gas flow, in order to further increase its cutting performances.

Once these solid particles have been introduced into the gas flow, they artificially increase the mass of the working gas and consequently increase its kinetic energy, without causing the cooling effect described above caused by a working gas flow at high pressure.

The solid particles may thus be in the form of one or several mixed metallic powders, these powders preferably being heavy and having different melting points, such as tungsten or molybdenum.

To achieve this, the cutting device 1 may comprise an auxiliary nozzle 20, also called a "tandem nozzle", capable of introducing solid particles into the working gas flow, after the flow has been ejected from the nozzle 12. Obviously, it would also be possible to introduce solid particles into the working gas flow before it is ejected from the nozzle 12 of the device 1, without going outside the scope of the invention.

In the preferred embodiment of the invention shown in the single FIGURE, the auxiliary nozzle 20 is mounted on the working gas ejection nozzle 12, at an external wall 22 of this nozzle, preferably in an approximately conical shape. For example, this auxiliary nozzle 20 may be adjusted so as to authorize a solid particles flow of between 5 and 20 g/min.

Thus, an output orifice 24 from the auxiliary nozzle 20 and the output orifice 14 from the nozzle 12 are located close to each other, the output orifice 24 preferably being arranged below and at the side of the output orifice 14 from the nozzle 12. In other words, the output orifice 24 from the auxiliary nozzle 20 is located between the nozzle 12 and the part to be cut, so that solid particles can correctly integrate the working gas flow ejected from this nozzle 12. In this way, a mix consisting of the working gas and solid particles can easily enter into the chase, in order to expel the molten metal.

It is indicated that solid metallic powder type particles are transported using a gas that can be practically the same as the gas used to form the working gas.

Comparative tests were carried out to measure the improvement in cutting performances achieved by the addition of solid particles into the working gas flow. Tables summarizing the results obtained are given below. Note also that the laser power supply was fixed at 6 kW, the working gas flow pressure ($N_2$) was fixed at 2 bars and the diameter of the focal spot was 2 mm, for all the tests carried out.

TABLE 1

|  | Working gas flow without solid particles | Working gas flow with solid particles |
| --- | --- | --- |
| Maximum cut thickness (mm) | 70 | 100 |

In this first table, it can be seen that the introduction of solid particles into the working gas flow can very significantly increase the maximum thickness that can be cut, for constant parameters, since an increase of this thickness of 42% was observed.

TABLE 2

|  | Working gas flow without solid particles | Working gas flow with solid particles |
| --- | --- | --- |
| Maximum cutting speed (mm/min.) | 35 | 50 (tungsten)<br>40 (molybdenum)<br>40 (316L) |
| Roughness (μm) | 28 (top)<br>44 (middle) | 15 (top)<br>26 (middle) |

In this second table, the tests were carried out on parts with a constant thickness of 60 mm.

With reference to the first line, it can be seen firstly that introduction of solid particles into the working gas flow considerably increases the maximum cutting speed, without leaving any residual attachment points, with a particularly useful increase of about 40% if tungsten is used.

Furthermore, the second line in this table shows that the roughness is very much reduced, both at the top and in the middle of the cut part.

Furthermore, during all the tests carried out, it has also been observed that the addition of solid particles into the working gas eliminates planeness defects on the cut part, large numbers of these defects having been encountered on the surface of a part of about 5 mm$^2$, when using a gas flow without any solid particles.

Secondly, the cutting device 1 is designed such that the head 2 can be disconnected from the device 1. Disconnection can be made using remote controllable means, as is known in prior art. Furthermore, the head 2 may be disposed of, which is particularly useful when used for dismantling nuclear installations. The specific feature of being disposable is due to the fact that the head 2 has a simple design and is therefore low cost, particularly due to the absence of any cooling system and adjustment system, such as a positioning adjustment system or an optical adjustment system.

There are many applications for the invention, particularly in the nuclear field. This device 1 may be used for dismantling nuclear installations. Other examples include cutting irradiating and/or contaminated elements in a cutting cell, dismantling of a cell with the cutting phase for all its internal installations, or very specialized work on reactors after a shutdown or an accident.

This invention can also be used in the shipbuilding industry in which thick plates are widely used. The invention could thus replace torch and plasma torch techniques traditionally used in this field.

Obviously, those skilled in the art could make various modifications to the device that has just been described as a non-limitative example only.

Finally, note that the invention also relates to a cutting method that could be used with such a cutting device 1.

What is claimed is:

1. A laser cutting method for parts thicker than 10 mm, the method comprising:

using a laser beam passing through an optical mechanism producing a focal spot with a diameter of between about 1.5 and 3 mm; and ejecting a working gas flow at a pressure of between about 1 and 3 bars, wherein solid particles are added into the gas flow.

2. A laser cutting method according to claim 1, wherein the solid particles are composed of at least one metallic powder.

3. A laser cutting method according to claim 1, wherein an angle of convergence of the laser beam at an output from the optical mechanism is less than about 10°.

4. A laser cutting method according to claim 1, wherein the focal spot of the laser beam is located on a top surface of a part to be cut.

5. A laser cutting method according to claim 1, wherein the laser beam extends over a distance of between about 40 and 60 mm before passing through the optical mechanism.

* * * * *